(No Model.) 2 Sheets—Sheet 1.

J. H. H. DUNCAN.
APPARATUS FOR MANUFACTURING BUTTER.

No. 556,339. Patented Mar. 17, 1896.

Witnesses
O. M. Werle
E. C. Duffy

Inventor
John Henry Hill Duncan
per O. E. Duffy
Atty.

(No Model.) 2 Sheets—Sheet 2.
J. H. H. DUNCAN.
APPARATUS FOR MANUFACTURING BUTTER.
No. 556,339. Patented Mar. 17, 1896.
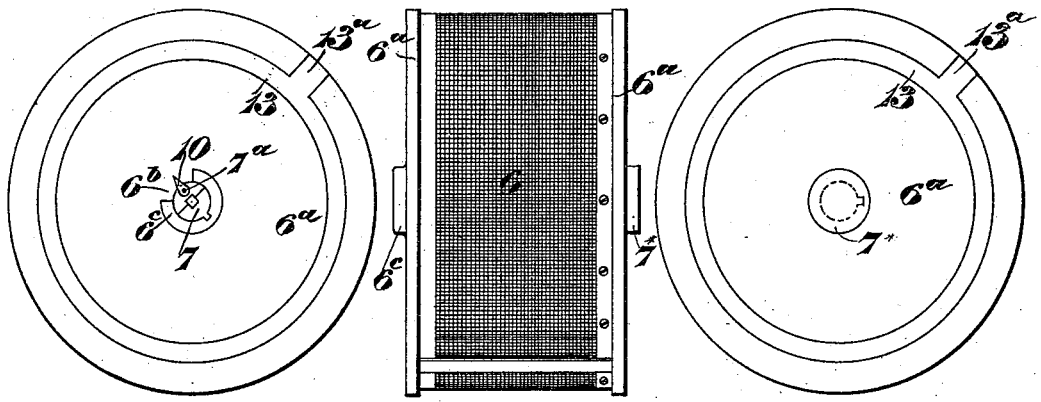
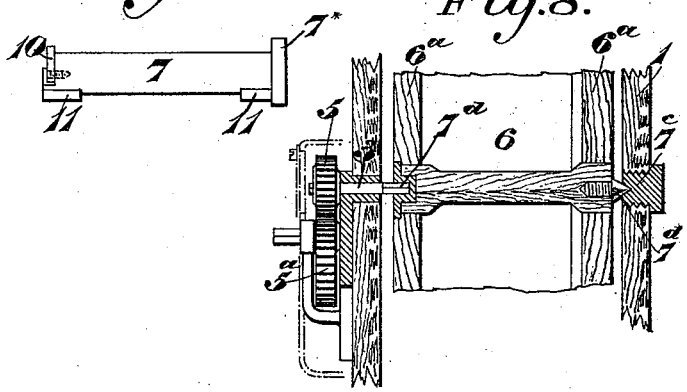
Witnesses
C. M. Werle
E. C. Duffy
Inventor
John Henry Hill Duncan
per. O. E. Duffy Atty.

UNITED STATES PATENT OFFICE.

JOHN HENRY HILL DUNCAN, OF LONDON, ENGLAND, ASSIGNOR TO THE DISC CHURN COMPANY, LIMITED, OF SAME PLACE.

APPARATUS FOR MANUFACTURING BUTTER.

SPECIFICATION forming part of Letters Patent No. 556,339, dated March 17, 1896.

Application filed February 7, 1894. Serial No. 499,332. (No model.) Patented in England July 10, 1893, No. 13,400.

*To all whom it may concern:*

Be it known that I, JOHN HENRY HILL DUNCAN, a subject of the Queen of Great Britain and Ireland, residing at 39 Coleman Street, in the city of London, England, have invented Improvements in and Relating to Apparatus for Use in the Manufacture of Butter, (for which I have obtained English patent No. 13,400, dated July 10, 1893,) of which the following is a specification.

In the specification of Letters Patent No. 517,817, dated April 3, 1894, I have described apparatus for use in the manufacture of butter comprising a vessel to contain the cream to be converted into butter, one or more rotary vertical disks arranged to rotate therein, and a hood cover or guard arranged above the disk or disks and against which the cream is thrown by centrifugal force by the said disk or disks, so as to be finally converted by the concussion it receives into butter-granules. I have also provided devices to enable the butter-granules to be washed in the same apparatus in which they have been formed, although such device forms no part of this application.

Now my present invention has for its object among other things to enable apparatus of the kind hereinabove referred to to be also utilized to form part of a drying-machine wherein the butter-granules after being washed can be quickly and effectually dried, thereby considerably reducing the cost of the plant necessary for the complete manufacture of butter and economizing space.

The invention consists in certain novel features of construction and in combinations of parts more fully and particularly described hereinafter and pointed out in the claims.

Figure 1:
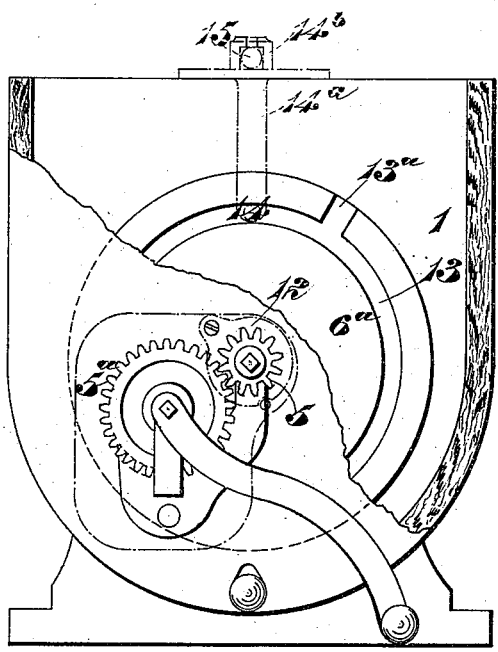
Figure 2:
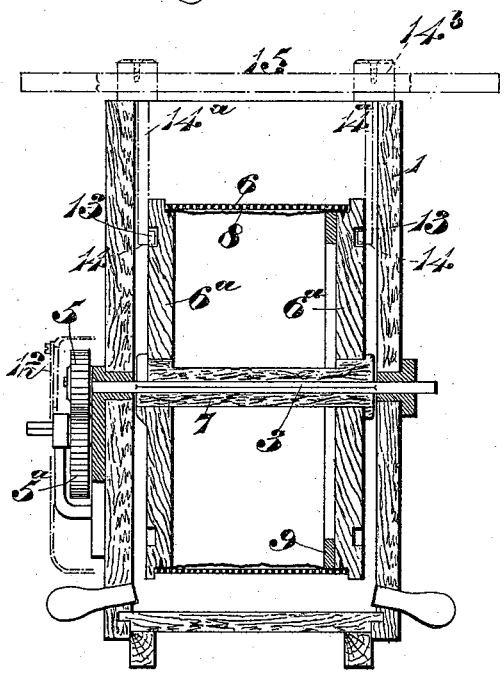
Figure 3:
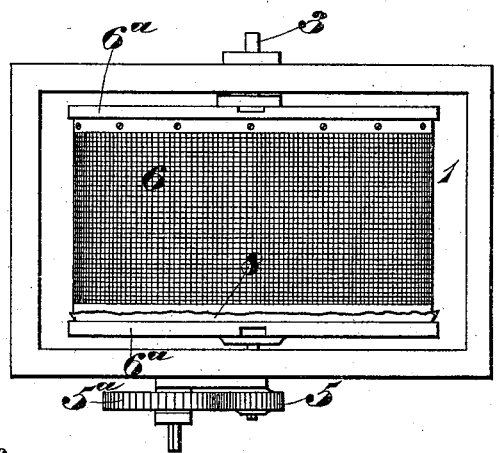

In the accompanying drawings, Figures 1, 2, and 3 are respectively a part front elevation, a cross-section, and a plan of a churn apparatus of the kind last herein referred to, but with the disk or disks employed for the churning and washing operations replaced by a basket such as described to adapt it for use as a centrifugal drying-machine. Figs. 4 and 5 are elevations of the respective ends of the basket; Fig. 6, a side view thereof, and Fig. 7 a plan of its hollow boss. Fig. 8 is a sectional detail view illustrating a modified construction hereinafter referred to.

1 is a churning-vessel, having its top provided with a suitable removable cover (not shown) and with a shaft 3, having pinion 5 driven from gear $5^a$, which can be rotated by a detachable handle. This shaft is arranged to carry the churning-disks.

6, Figs. 4 to 7, inclusive, shows a cylindrical basket having a perforated or reticulated periphery and end walls $6^a$ carried by a central hollow boss 7 adapted to fit the rotary spindle 3, Figs. 1, 2 and 3, which, except its ends, may be of square form in cross-section.

8 is a lining of material such as muslin. To enable this lining and the butter-granules to be readily placed within the basket one of the end walls $6^a$ is in the example shown made removable, the inner end of the muslin lining being held in place by a ring 9, while its outer end is held in place by the removable end wall $6^a$, which is adapted to be held in the closed position by a catch 10, Figs. 4 and 7. This catch is pivoted to a recessed part $7^a$ of the boss 7 and is adapted to bear against a recessed or cut-away part $6^b$ of the boss $6^c$ of the said end wall without projecting beyond the end surface of such boss. The boss 7 is preferably made detachable, as shown in Fig. 7, and is provided with a head $7^*$ and with keys 11 for engagement with the end walls $6^a$.

The rotary spindle 3, which extends through the two sides of the vessel 1, is, in the arrangement now being described, made capable of being withdrawn endwise, together with the pinion 5, when it is desired to replace the churning-disks by the basket. Normally it is held endwise in place by any suitable means, such as a plate 12, which may be pivoted to a guard or protective casing inclosing the gearing 5 $5^a$, as shown in dotted lines in Figs. 1 and 2.

To facilitate the fitting of the basket to the spindle 3, its end walls may advantageously be each formed with an annular recess 13 and a radial recess $13^a$ to receive a laterally-projecting pin 14, carried by a bar $14^a$, formed with an eye portion $14^b$, which is fixed to a rod 15 and is adapted to bear upon the upper sides of the side walls of the vessel 1, as indicated in dotted lines in Figs. 1 and 2, the arrangement being such that by inserting the pins 14 through the radial recesses $13^a$ in the end walls of the basket 6 and afterward partly turning the basket, the said pins enter the annular recesses 13. Then upon inserting the basket in the vessel 1 and allowing the eye portions $14^b$ to bear upon the side walls of the vessel 1, as shown, the said bars $14^a$ will hold the basket suspended with its axis in the same horizontal plane as that containing the axis of the spindle 3, so that all that will be necessary to do to enable the said spindle to be passed through the boss 7, so as to carry the basket, will be to adjust the basket horizontally until the hole in the boss is brought opposite the spindle. As will be seen the arrangement is such that after the butter-granules have been formed and washed, and it may be brined, in the vessel 1 the rotary vertical churning-disks can be readily removed and replaced by the basket 6, into which the muslin or other lining and washed butter-granules have been previously placed, so that upon then rapidly rotating the said basket about its horizontal axis by means of the spindle 3 and gearing 5 $5^a$ the water mixed with the butter-granules will be removed therefrom by centrifugal force through the periphery of the basket. The vessel 1 may at this time be advantageously covered by a cloth that will serve to catch the water thrown off by centrifugal force.

In the modified construction shown in Fig. 8 the basket 6 is provided at one side with a projection or spindle $7^d$, adapted to enter or engage with a bearing $7^c$, carried by one side of and within the vessel 1, and at the other side is provided with a socket $7^d$, adapted to engage with and be supported by the inner end of the driving-spindle 3, which is then made only of sufficient length to pass through the opposite side of the vessel and engage with the socket, as shown. In this case to enable the disk or disks to be readily inserted within and removed from the vessel, as required, the sides thereof or the ends of the boss $4^a$ upon which it or they is or are fixed may be similarly constructed.

Although I consider it advantageous to adapt the basket to be used in a butter-making machine of the kind herein referred to, as described, it is to be understood that such a basket may be combined with a vessel having a hood, cover or guard, so as to form a drying-machine intended only for drying, in the manner described, butter-granules that have been formed and washed, and it may be brined, in a separate machine or machines, or the vessel may be dispensed with, the basket being simply covered by a removable casing or cloth supported out of contact with the basket and serving to catch the water thrown off from the basket by centrifugal force. In either case the drying-machine may be combined with a churn if desired.

What I claim is—

1. A butter-drying basket comprising a horizontal driven axis, a pair of heads on said axis and normally closing the ends of the basket, a reticulated periphery between the heads and inclosing the drying-chamber, a textile lining on the inner surface of said reticulated periphery, means for securing the same, one of said heads being removable from the axis and periphery to permit access to the interior of the drying-chamber and means, substantially as described, to confine said removable head in position on the axis and supporting one end of the periphery, substantially as described.

2. The combination with a churn-body, and dasher-driving gear, of the reticulated butter-drying basket removably coupled with said gear and having its heads provided with the annular grooves having cross-openings, and the cross bar or rest on the churn-body having hangers to removably enter said grooves and hold the basket while being adjusted and coupled to the driving-gear, substantially as described.

3. The churn-body, having a removable drive-shaft extending therethrough, the butter-drying basket having the tubular axis arranged removably on said shaft, the two heads on said axis, one rigid and the other removable, a catch mechanism for the removable head, the reticulated periphery fitting said heads, and the cloth lining clamped to one head, and clamped between the periphery and the removable head.

4. The combination with the inclosing churn-body, and the dasher-rotating shaft, of the butter-drying basket having its axis removably fitted on said shaft to rotate therewith, the end heads on said axis, the cloth-lined reticulated periphery around and supported by said heads, one of said heads being removable from the periphery and longitudinally movable on the axis, substantially as described.

5. A churn-body, and the removable dasher-shaft extending horizontally therethrough and provided with exterior driving means, in combination with the butter-drying basket arranged to rotate in the churn composed of a tubular axis through which the shaft removably passes, the heads on said axis and the reticulated periphery on said heads being removable from the axis and periphery, substantially as described.

In testimony whereof I have signed my name to this specification in the presence of two subscribing witnesses.

JOHN HENRY HILL DUNCAN.

Witnesses:
J. A. CAMPBELL,
WILLIAM CROSS.